Patented Nov. 18, 1947

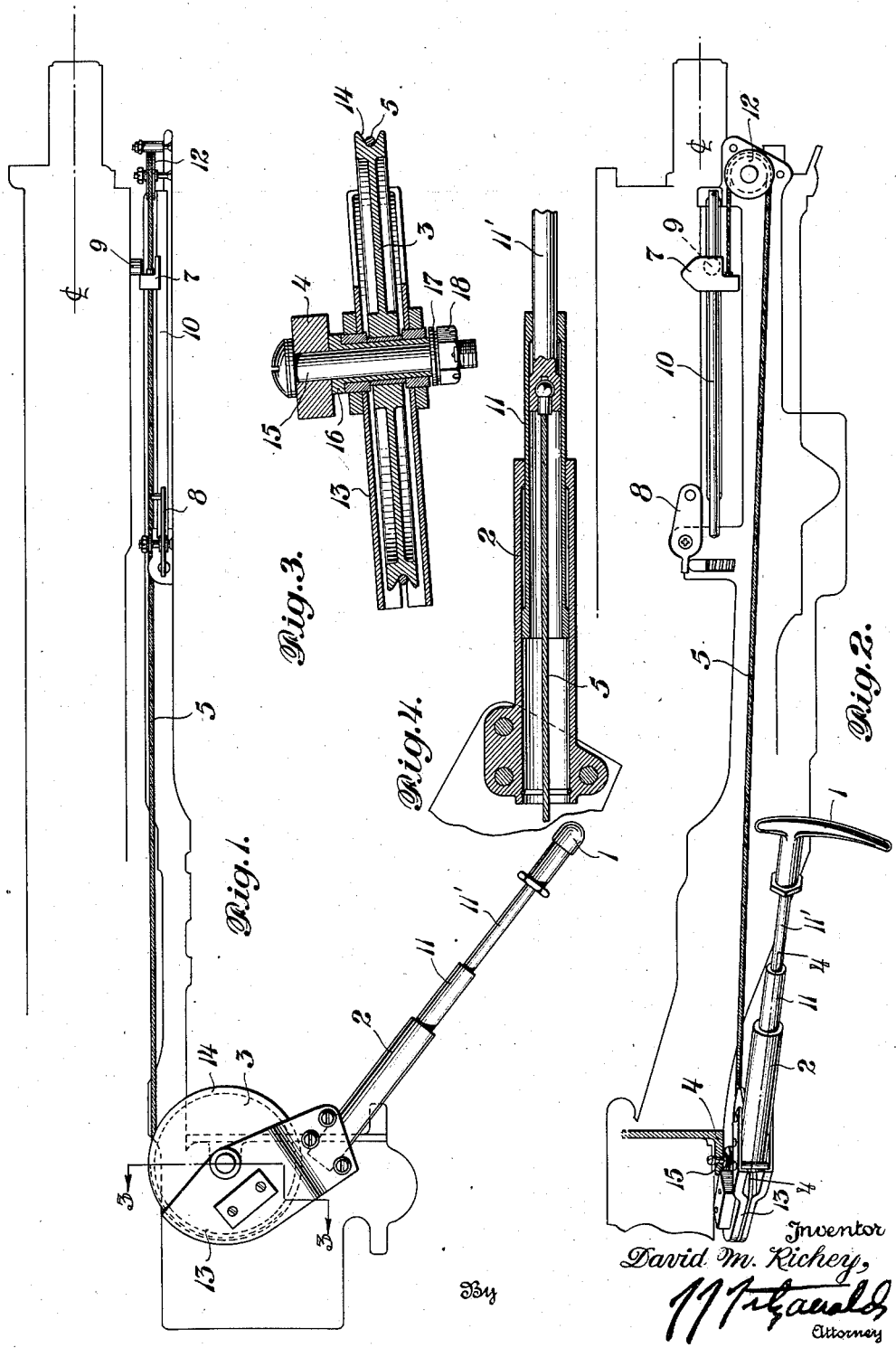

2,431,079

UNITED STATES PATENT OFFICE 2,431,079

GUN CHARGER INSTALLATION

David M. Richey, Devon, Conn., assignor to United Aircraft Corporation, East Hartford, Conn., a corporation of Delaware Application February 12, 1944, Serial No. 522,132

3 Claims. (Cl. 74—501)

The present invention pertains to an improvement in gun chargers. Trouble has been experienced in operating manually operated chargers on airplane machine guns in that the charging cable upon release of the handle, would sometimes whip sufficiently out of line with the pulley, as it snapped back, to wedge between the pulley and its cage, thus interfering with the proper operation of the firing pin when released by the firing mechanism.

The object of the present device is to prevent such whipping of the cable upon its release to avoid misfires.

A further object is to provide a lightweight, simple manually operated charger of the type mentioned, which will be efficient in its operation.

A further object is to provide a charger handle assembly that will pull the cable in a straight line and prevent it from "whipping" as it snaps back into the original position under the spring action of the charging pin.

A further object is to provide a swivelled handle end of a charging cable with telescopically fitting means to guide the cable in a straight line at any suitable angle within the plane of the swivel pulley, thereby preventing any binding at the pulley or whipping of the cable end as the handle is released and the cable snaps back into its original position.

Further and more specific objects will appear as the description of this device proceeds, having reference to the accompanying drawings, wherein:

Fig. 1 is a plan view of the gun charger mechanism showing the improved attachment at the handle end of the cable, Fig. 2 is a side view thereof, Fig. 3 is a detail section taken at the line 3—3 of Fig. 1, and Fig. 4 is a detail section taken at 4—4 of Fig. 2.

Referring to the drawing handle 1 and lever arm assembly 2, mounted on clamp assembly 4, will pivot part way about pulley 3 to which assembly is mounted drawing cable 5 which unlocks slide 7 from latch 8. Slide 7 engages charging pin 9 of the gun and pulls the pin to the position shown, thus charging gun. Spring action in gun mechanism (not shown) on pin 9 returns pin and slide to original positions, slide 7 locking into position by latch 8.

The initial pull on the cable is normally difficult and the mechanical action of pivoting the lever arm assembly 2 about the pulley 3 was designed to overcome this factor and facilitate ease of operation by the gunner.

Fig. 4 illustrates in detail the nested sections 11 and 11' fitting slidably in the assembly 2 and connected to handle 1 in such manner that when the handle is pulled, sections 11 and 11' telescopically extend from the assembly sleeve 2 allowing the cable to be pulled only in a straight line and also preventing the cable from "whipping" as it snaps back into the original position under spring action of the charging pin.

To describe the device more specifically, portions of the outline of the gun with its centerline are included in Figs. 1 and 2 in order to show the orientation of the charging mechanism thereon. Fig. 1 shows the mechanism as seen from the top, and Fig. 2, from the side. The operating handle 1 is mounted on the end member 11' of the telescopically nested assembly. The cable 5 is attached to the other end of this end member and passes through the assembly to the pulley 3, then rearwardly to the pulley and finally in a forward direction where its other end is fastened to the slide 7 which slides on the bar 10.

As the handle 1 is pulled, the cage 13, swivelled on the shaft 15 on which the pulley 3 is mounted, aligns itself with the direction of pull and the nested members 11 and 11' maintain alignment of the cable with the pulley, since the asssembly sleeve 2 is rigidly fastened to the cage 13 in a tangential position with respect to the pulley groove 14.

During the operating stroke of the handle 1, the slide 7 draws the charging pin 9 through its charging stroke against spring action to a position where the firing pin is cocked. When the handle 1 is released, charging pin 9 is returned by the spring action to its original position and moves the slide 7 under the latch 8 to lock it in its inoperative position until the next charging stroke.

The nested assembly shown is composed of three members. It may, however, include any number of telescopically arranged elements between the sleeve 2 and the end member 11', depending on the design desired for any particular installation.

The partial cage 13 is mounted on bearing sleeve 16 which is held rigidly on the shaft 15 between the clamp assembly or bracket 4 and the washer 17 by locked nut 18. The pulley 3 is also mounted on this bearing sleeve within the cage portion 13.

Various changes in design may be made without departing from the scope of this invention as defined in the appended claims.

What is claimed is:

1. A gun charger mechanism comprising a grooved pulley, a cage assembly swivelled on the pulley shaft, a lever assembly fastened thereto composed of a series of nested members tangentially aligned with the pulley groove, a cable around said pulley, passed through said lever assembly and having its end attached to the outer of the nested members and a handle fastened to the end of said outer member.

2. A gun charger mechanism comprising a shaft, a pulley thereon, a cage swivelled on said shaft, having an extensible lever assembly tangent to said pulley comprising a series of telescopically arranged members, the end member thereof having an operating handle, and a cable attached to said end member and passed through said assembly and around said pulley, whereby the cable end is maintained in tangential alignment with said pulley during operation of the handle which is free to turn about the pulley shaft to align itself with the direction of pull.

3. A gun charger mechanism comprising a handle, a shaft, a pulley thereon, a cable passed around said pulley and attached to said handle, and extensible guide means swivelled on said shaft for maintaining said handle tangentially aligned with said pulley during operation.

DAVID M. RICHEY.

REFERENCES CITED

The following references are of record in the file of this patent:

UNITED STATES PATENTS

| Number | Name | Date |
|---|---|---|
| 2,332,631 | Gasser | Oct. 26, 1943 |

FOREIGN PATENTS

| Number | Country | Date |
|---|---|---|
| 675,861 | Germany | May 19, 1939 |